United States Patent
Hulsey

[11] Patent Number: 5,102,275
[45] Date of Patent: Apr. 7, 1992

[54] DECK PLATE AND ASSEMBLY

[75] Inventor: Tommy R. Hulsey, Wyomissing

[73] Assignee: Construction Fasteners, Inc., Reading, Pa.

[21] Appl. No.: 604,920

[22] Filed: Oct. 29, 1990

[51] Int. Cl.⁵ ..................... F16B 35/04; F16B 37/04
[52] U.S. Cl. ..................... 411/134; 411/154; 411/533; 411/545; 52/410
[58] Field of Search ............ 411/131, 133–135, 411/143–146, 154, 531, 533, 949, 545; 52/410, 512

[56] References Cited

U.S. PATENT DOCUMENTS

| | | | |
|---|---|---|---|
| 2,257,959 | 10/1941 | Hoppenstand | 411/134 |
| 3,434,520 | 3/1969 | Bedford, Jr. | 411/134 |
| 4,034,788 | 7/1977 | Melone | 411/134 |
| 4,763,456 | 8/1988 | Giannuzzi | 411/533 |
| 4,892,429 | 1/1990 | Giannuzzi | 411/395 |

Primary Examiner—Neill R. Wilson
Attorney, Agent, or Firm—Leonard M. Quittner

[57] ABSTRACT

A planar stress plate-buttress thread fastener assembly in which the stress plate's annulus has teeth formed on the perimeter thereof and pointed in the direction of the installation rotation of the fastener. The teeth are deflected downward out of the plane of the plate such that when the fastener is counterrotated the teeth will penetrate the fastener and prevent backout.

28 Claims, 2 Drawing Sheets

FIG. 3a
PRIOR ART
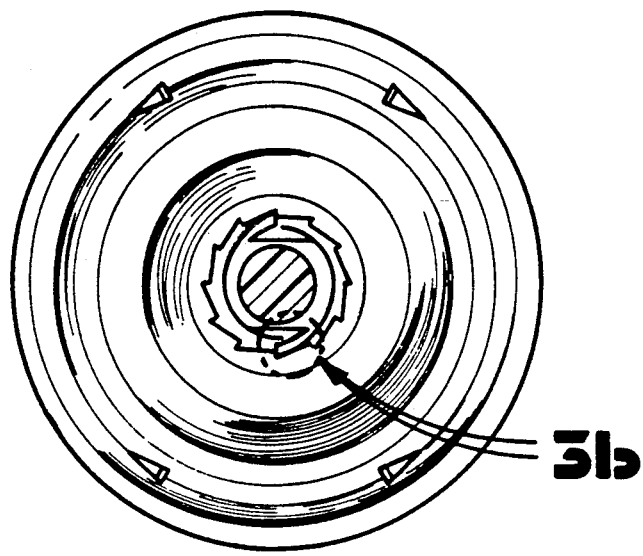
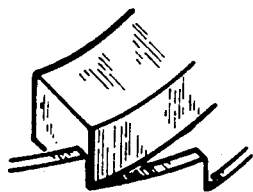
FIG. 3b
PRIOR ART
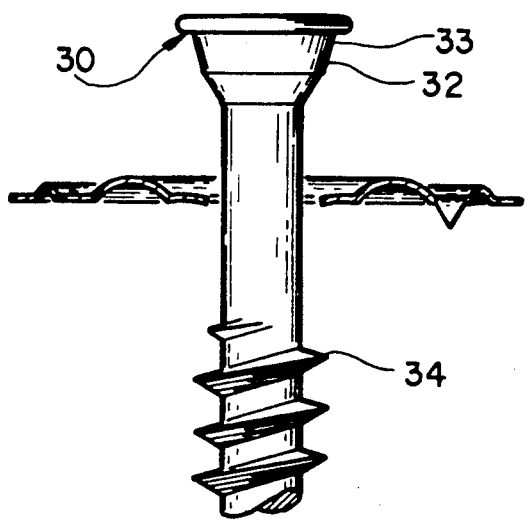
FIG. 4a
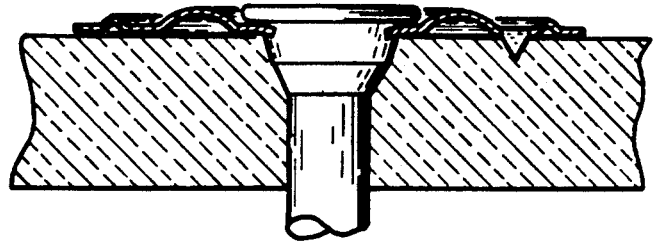
FIG. 4b

DECK PLATE AND ASSEMBLY

CROSS-REFERENCES

There are no cross-references to, nor are there any, related applications.

FEDERALLY-SPONSORED RIGHTS

The invention herein was made without any Federal sponsorship or contribution.

BACKGROUND OF THE INVENTION

1. The Field of the Invention

The field of the invention relates to an improved fastener assembly useful in securing insulation materials to a deck in which the deck is made of a porous or fibrous material such as gypsum or wood. More particularly the invention relates to a combination of a stress plate with a buttress thread type fastener.

2. Description of the Prior Art

Backout by uplift or rotation of a fastener installed in a stress plate to hold down insulation on a roof is an ongoing problem in the roof installation trade. Many attempts in the prior art have been made to solve the problem without successor only partial success.

The prior art is best demonstrated by U.S. Pat. No. 4,892,429 (Jan. 9, 1990 to Giannuzzi) which discloses but does not claim a buttress thread-type fastener on the underside of whose head is formed a pawl which mates with a ratchet arrangement formed on the perimeter of the annulus of a stress plate. During installation the pawl does not resist rotation and seats itself locked in the ratchet at maximum torque. Anti-backout is provided to some extent thereby. In service, it is possible for the ratchet tooth which is essentially coplanar to the stress plate to cut into and through the pawl since the plate is generally of metal and the fastener of 30% glass reinforced nylon. It is presumed that the disclosed subject matter is still part of a continuing patent application.

NTB Fastening Systems, Inc., Mosinee, Wis., provides its "Magnum (TM)" system utilizing a plastic washer insert having fingers disposed radially inward about its annulus. These hold a buttress thread fastener in assembly relationship with a stress plate to facilitate installation. During installation the fingers, made of materials as soft or softer than the fastener are meant to deform and are not capable of providing anti-backout, or anti-rotational forces.

SUMMARY OF THE INVENTION

An object of the present invention is to provide improved anti-backout and anti-rotational forces to a deck plate assembly in which a buttress thread fastener is utilized in conjunction with a stress plate.

Accordingly, to accomplish the foregoing, the present invention is summarized as a buttress thread type fastener in combination with a planar stress plate which has formed on the perimeter of the plate's annulus a multiplicity of teeth pointed in the direction of fastening rotation which are deflected downward or upward out of the plane of the plate depending on the materials used in fabricating the plate such that when the fastener is rotationally installed into a deck the teeth will not interfere with the fastener but when backout is attempted the teeth will grip into the fastener and interfere with backout thereby preventing it.

Other objects, advantages and features of the present invention will be apparent to those skilled in the art from the following description taken in conjunction with the accompanying drawings.

DESCRIPTION OF THE DRAWINGS

The present invention may be better understood by reference to the drawings wherein 4 figures are shown on 2 sheets. The numbers shown on the drawings for the various parts of the invention are consistent throughout so that a number indicating a part in one drawing will indicate the same part in another drawing.

FIG. 3a (Prior Art) is a plan view of certain prior art thought to be applicable to the present invention.

FIG. 3b (Prior Art) is a perspective view of the ratchet arrangement disclosed in FIG. 3a as Prior Art.

FIG. 4a shows an assembly in cross sectional comprising a buttress thread type fastener and the plate of the invention.

FIG. 4a is a cross-sectional view of an assembly of the invention as it is being installed in a deck.

FIG. 4b is a cross-sectional view of an assembly of the invention as it is finally installed in a deck.

DESCRIPTION OF THE PREFERRED EMBODIMENT

Figure 1:
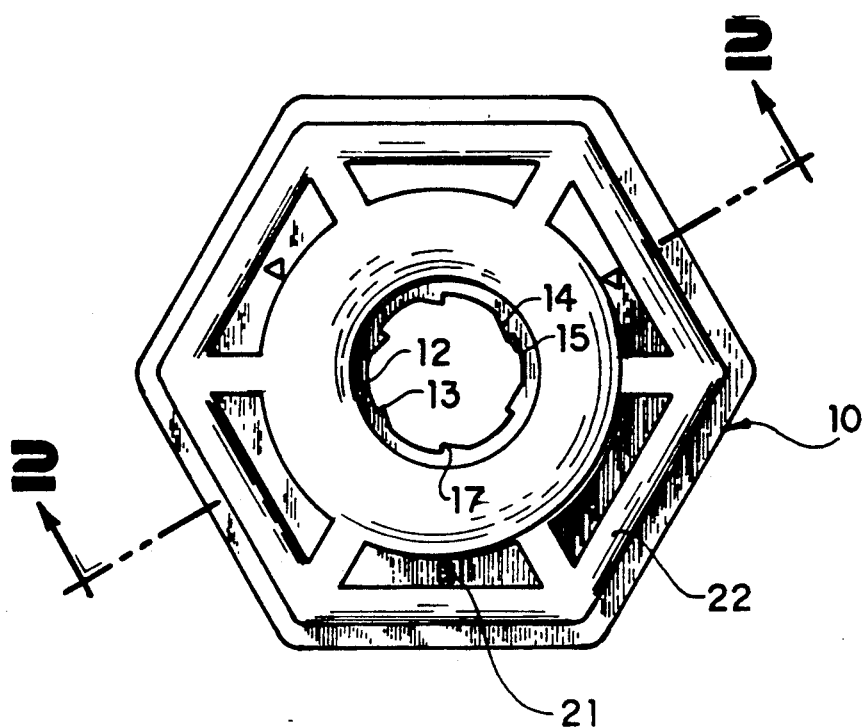
FIG. 1 shows a plan view of the plate of the invention.
Figure 2:
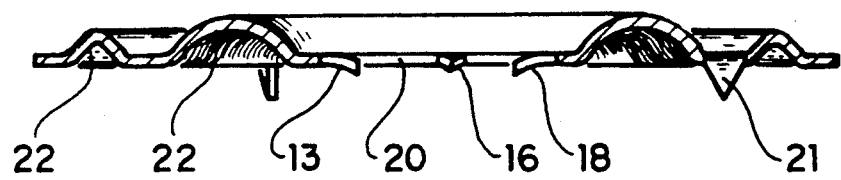
FIG. 2 is a cross-sectional view of the plate of FIG. 1 through Line 2—2.

The preferred embodiment is described as comprising a planar metal stress plate 10 with an annulus about whose perimeter 12 are formed a multiplicity of pointed teeth 13 each tooth having first straight side 14 which is longer than a second straight side 15 and whose point 16 is defined by the intersection of the first and second side at a defined angle 17. Each tooth is disposed equiangularly about the perimeter and is pointed in the direction of the rotation of the thread of a buttress thread fastener 30 made of plastic, typically 30% glass reinforced nylon having a head 31 and a hub 32 which is of a greater diameter 33 than the major diameter 34 of the threads and will be in interference fit relationship to the tooth points (See FIG. 4b). Additionally, each tooth is deflected downward 18 out of the major plane of the stress plate. It has been found that 6 teeth disposed about the perimeter of a size which leaves a substantial length of perimeter 20 between teeth. It has also been found that thickness of the material used to fabricate the stress plate shall determine whether the teeth shall be deflected downward or upward.

Additional anti-rotation as well as anti-windshear capability may be added to the plate by piercing it downward with prongs or barbs 21 and ribs 22.

Attention is directed to FIGS. 4a–b. During installation, the buttress threads cut into the deck material and pull the head against the plate. Any anti-rotational force which causes the fastener to attempt backout will be impeded by teeth biting and digging into the shank of the fastener. By disposing the teeth in the direction of rotation the teeth will not interfere with installation.

Since many modifications, variations and changes in detail may be made to the presently described embodiment, it is intended that all matters in the foregoing description and accompanying drawings be interpreted as illustrative and not by way of limitation.

What is claimed is:

1. A planar stress plate for fastening insulation to a roof deck wherein the plate is made of metal and has an annulus about whose perimeter are formed a multiplicity of pointed teeth pointed in a defined direction, all of which are bent downward at a defined angle from the plane of the plate, are a defined distance apart and are for penetrating engagement with a fastener's shank inserted through the annulus and fastened to the deck, the fastener having a defined direction of rotation for fastening.

2. A planar stress plate as in claim 1 wherein each tooth has a base of a defined length along the perimeter and has a first straight side which is longer than a straight second side and whose point is defined by the intersection of the first and second side at a defined angle and is pointed in the direction of fastening rotation.

3. A planar stress plate as in claim 2 wherein the defined angle of intersection is 90 degrees.

4. A planar stress plate is in claim 2 wherein the defined length of the base is such that a substantial length of perimeter is left blank.

5. A planar stress plate as in claim 1 wherein the teeth are not more than 6 in number.

6. A planar stress plate as in claim 1 wherein the teeth are disposed at points equiangularly about the perimeter.

7. A planar stress plate as in claim 1 wherein the defined angle of bend of each tooth is at least 15 degrees.

8. A planar stress plate as in claim 1 and 7 wherein the teeth are bent downward.

9. A planar stress plate as in claim 1 wherein the plate's metal is chosen from a class consisting of galvanized steel, stainless steel and aluminum.

10. A planar stress plate as in claim 9 wherein the metal is galvanized steel.

11. A planar stress plate as in claim 1 wherein the tooth points lie on a circle of a defined diameter.

12. A planar stress plate as in claim 11 wherein the diameter of the circle defines an interference fit with the shank on a threaded fastener having a head and a shank whose diameter is greater than the major diameter of the fastener's threads.

13. A planar stress plate as in claim 12 wherein the fastener is made of a penetrable material.

14. A planar stress plate as in claim 12 wherein the penetrable material is glass reinforced nylon.

15. A planar stress as in claim 1 wherein the plate is equipped in the ribs in the body thereof to increase rigidity of the plate and a multiplicity of downward directed barbs for gripping the insulation.

16. A stress plate of assembly for fastening insulation to a roof deck comprising.
  (a) a planar stress plate made of metal which has an annulus about whose perimeter are formed a multiplicity of pointed teeth pointed in a defined direction, all of which are bent downward at a defined angle from the plane of the plate and are a defined distance apart; together with
  (b) a threaded fastener inserted through the annulus, the fastener having a defined direction of rotation for fastening, a head and a shank whose diameter is greater than the major diameter of the fastener's threads and is penetratingly held by the teeth points.

17. A planar stress plate assembly as in claim 16 wherein each tooth of the stress plate has a base of a defined length along the perimeter and has a first straight side which is longer than a straight second side and whose point is defined by the intersection of the first and second side at a defined angle and is pointed in the direction of rotation for fastening.

18. A stress plate assembly as in claim 17 wherein the defined length of the base of the stress plate's tooth is such that a substantial length of the perimeter is left blank.

19. A stress plate assembly as in claim 17 wherein the defined angle of intersection is 90 degrees.

20. A stress plate assembly as in claim 16 wherein the stress plate's teeth are not more than 6 in number.

21. A stress plate assembly as in claim 16 wherein the stress plate's teeth are disposed at points equiangularly about the perimeter.

22. A stress plate assembly as in claim 16 wherein the defined angle of bend of each tooth is about 15 degrees.

23. A stress plate assembly as in claim 16 and 20 wherein the teeth are bent downward.

24. A stress plate assembly as in claim 16 where in the stress plate's metal is chosen from a group consisting of galvanized steel, stainless steel and aluminum.

25. A stress plate assembly as in claim 21 wherein the metal is galvanized steel.

26. A stress plate asesmbly as in claim 16 wherein the fastener is made of a penetrable material.

27. A stress plate assembly as in claim 26 wherein the penetrable material is glass reinforced nylon.

28. A stress plate assembly as in claim 16 wherein the stress plate has formed in its body ribs to increase rigidity of the plate and a multiplicity of downward directed barbs to grip the insulation to prevent rotation of the plate when it is being installed.

* * * * *